(12) United States Patent
Seyffert et al.

(10) Patent No.: US 6,868,972 B2
(45) Date of Patent: Mar. 22, 2005

(54) FLUID FLOW DIFFUSERS AND VIBRATORY SEPARATORS

(75) Inventors: Kenneth W. Seyffert, Houston, TX (US); Gary Steven Strong, Huntsville, TX (US); Guy L. McClung, III, Spring, TX (US)

(73) Assignee: Varco I/P, Inc., Houston, TX (US)

( * ) Notice: Subject to any disclaimer, the term of this patent is extended or adjusted under 35 U.S.C. 154(b) by 115 days.

(21) Appl. No.: 10/287,056

(22) Filed: Nov. 4, 2002

(65) Prior Publication Data

US 2004/0084355 A1 May 6, 2004

(51) Int. Cl.[7] .................................................. B07B 1/28
(52) U.S. Cl. ..................... 209/254; 209/314; 209/316
(58) Field of Search ................................ 209/311, 314, 209/315, 316, 317, 254; 210/384, 388, 399

(56) References Cited

U.S. PATENT DOCUMENTS

| | | | | |
|---|---|---|---|---|
| 1,051,157 A | * | 1/1913 | Owens | 209/316 |
| 2,329,333 A | * | 9/1943 | Carter | 210/389 |
| 2,386,579 A | * | 10/1945 | Wheeler | 209/314 |
| 3,915,852 A | * | 10/1975 | Butzow | 209/253 |
| 4,116,288 A | | 9/1978 | Love | 175/66 |
| 4,306,974 A | * | 12/1981 | Harry | 210/388 |
| 4,350,591 A | * | 9/1982 | Lee | 210/384 |
| 4,495,065 A | | 1/1985 | DeReamer et al. | 209/243 |
| 4,634,535 A | * | 1/1987 | Lott | 210/780 |
| 5,346,053 A | * | 9/1994 | Dorn | 198/399 |
| 5,641,070 A | | 6/1997 | Seyffert | 209/314 |
| 6,079,568 A | | 6/2000 | Loshe | 209/311 |
| 6,155,428 A | | 12/2000 | Bailey et al. | 209/315 |
| 6,412,644 B1 | | 7/2002 | Crabbe et al. | 209/309 |
| 6,439,391 B1 | | 8/2002 | Seyffert | 209/238 |

FOREIGN PATENT DOCUMENTS

| | | | | |
|---|---|---|---|---|
| DE | | 3601671 A1 | * 7/1987 | ............ B07B/1/46 |
| WO | WO 96/33792 | | 4/1996 | |
| WO | WO 98/16328 | | 10/1997 | |

OTHER PUBLICATIONS

Int'l Search Report, PCT/GB03/04056, Jan. 15, 2004, 5 pp.

* cited by examiner

*Primary Examiner*—Donald P. Walsh
*Assistant Examiner*—Joseph C Rodriguez
(74) *Attorney, Agent, or Firm*—Guy McClung

(57) ABSTRACT

A vibratory separator including basket apparatus for holding screening apparatus, at least one upper screen apparatus in the basket, the at least one upper screen apparatus having a fluid exit end, at least one lower screen apparatus in the basket below the at least one upper screen apparatus, fluid flowable from the at least one upper screen apparatus down onto the at least one lower screen apparatus, flow diffusion apparatus mounted below the fluid exit end of the at least one upper screen apparatus and above the at least one lower screen apparatus, so that fluid flowing down from the at least one upper screen apparatus flows onto the flow diffusion apparatus and is diffused thereby, and vibrator apparatus for vibrating the basket and the screen apparatus therein.

25 Claims, 3 Drawing Sheets

FLUID FLOW DIFFUSERS AND VIBRATORY SEPARATORS

BACKGROUND OF THE INVENTION

1. Field of the Invention

The present invention is directed to vibratory separators and shale shakers, and, in certain particular aspects, to multi-deck separators and shakers with flow diffusers for diffusing fluid flowing from an upper deck to a lower deck.

2. Description of Related Art

Various prior art vibratory separators and shale shakers have one or more upper screening decks positioned above one or more lower screening decks. Although some fluid flows through the upper deck(s) to the lower deck(s), often upper deck(s) are positioned so that an exit end of the upper deck(s) is above part of a lower deck. In such a situation, fluid can flow directly from an upper deck to a lower deck without passing through screening, screens, or screen assemblies on the upper deck. In some circumstances, e.g. at relatively high fluid flow rates, fluid flowing from an upper deck to a lower deck can create a water barrier on the lower deck which impedes the desired movement of solids on the lower deck to an exit end of the lower deck. Such a fluid flow can also wear out part of the lower deck prematurely, resulting in poor performance and operation down time to fix or replace part of the lower deck.

The present inventors have recognized this long-standing problem and have recognized that there has long been a need to deal with it.

SUMMARY OF THE PRESENT INVENTION

The present invention, in certain aspects, discloses a vibratory separator or shale shaker with flow diffusing apparatus positioned below an exit end of an upper deck in a multi-deck machine and above a lower deck. The flow diffusing apparatus is located to intercept all, a significant part of, or the bulk of fluid flowing down from the upper deck thereby diffusing it to prevent it from impacting on a relatively small area of the lower deck and to spread the flow out over a larger area.

In certain aspects such a flow diffusing apparatus is solid without holes, perforations or openings. In other aspects, one or more holes extends through the flow diffusing apparatus. In certain aspects a flow diffusing apparatus according to the present invention has multiple parts so that its length and/or width are adjustable to accommodate a flow of a certain width or cross-sectional area.

In certain aspects the flow diffusing apparatus is generally flat. In other aspects it is "V" or "U" shaped when viewed in cross-section or on end. In certain aspects, such a flow diffusing apparatus is positioned relatively horizontally in a separator or shaker; and in other aspects it is positioned at an angle to the fluid flowing from above, canted either toward a fluid introduction end or toward a fluid exit end of the shaker or separator.

It is, therefore, an object of at least certain preferred embodiments of the present invention to provide:

New, useful, unique, efficient, non-obvious systems and methods for diffusing fluid flowing from an upper deck of a vibratory separator or shale shaker down onto a lower deck;

Such systems and methods with one or more fluid flow holes, openings, or perforations in a flow diffusion apparatus; and, in certain aspects, with area, length, and/or width adjustment to accommodate a flow of a particular area.

Such systems and methods with flow diffusion apparatus that is positioned either horizontally or at an angle to a base or mount of a separator or shaker; and New, useful, unique, efficient, and nonobvious shale shakers and vibratory separators with any such flow diffusion apparatus.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of certain embodiments of the invention may be had by references to the embodiments which are shown in the drawings which form a part of this specification.

DESCRIPTION OF EMBODIMENTS PREFERRED AT THE TIME OF FILING FOR THIS PATENT

Figure 1:
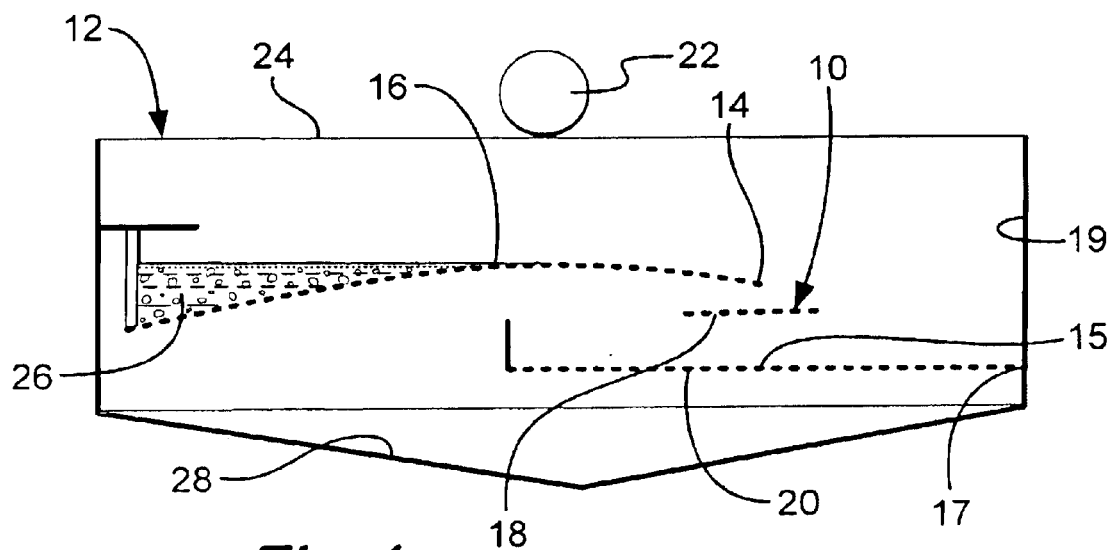
FIGS. 1–3 are side views in cross-section of shale shakers according to the present invention with flow diffusion apparatuses according to the present invention.

FIG. 1 shows schematically a shale shaker 12 according to the present invention with a flow diffusion apparatus 10 according to the present invention. Fluid flowing from an exit end 12 of an upper screening deck 16 hits the flow diffusion apparatus 10. Without the flow diffusion apparatus 10 in place, the fluid flowing from above would impact an area 15 on a lower screening deck 20. A basket 24 supports the screening decks. The flow diffusion apparatus 10 (as may be the case for any such apparatus according to the present invention) is secured to the basket 24. It is also within the scope of the present invention for the flow diffusion apparatus 10 (as may be any flow diffusion apparatus according to the present invention) to be connected to the upper screen deck, the lower screen deck, or both in addition to, or instead of, securement to the basket 24.

The flow diffusion apparatus 10 (as may any apparatus according to the present invention) has one or a series of holes 18 therethrough which permit fluid to flow therethrough down onto the lower screening deck 20.

A vibratory apparatus 22 (shown schematically) vibrates a basket 24 in which the upper screening deck 16 and lower screening deck 20 are mounted. Fluid to be treated is introduced into a pool end 26 of the shale shaker 12. Fluid flows from both screening decks down into a collection receptacle 28. Separated material exits from an exit end 17 of the lower screening deck 20.

Figure 2:
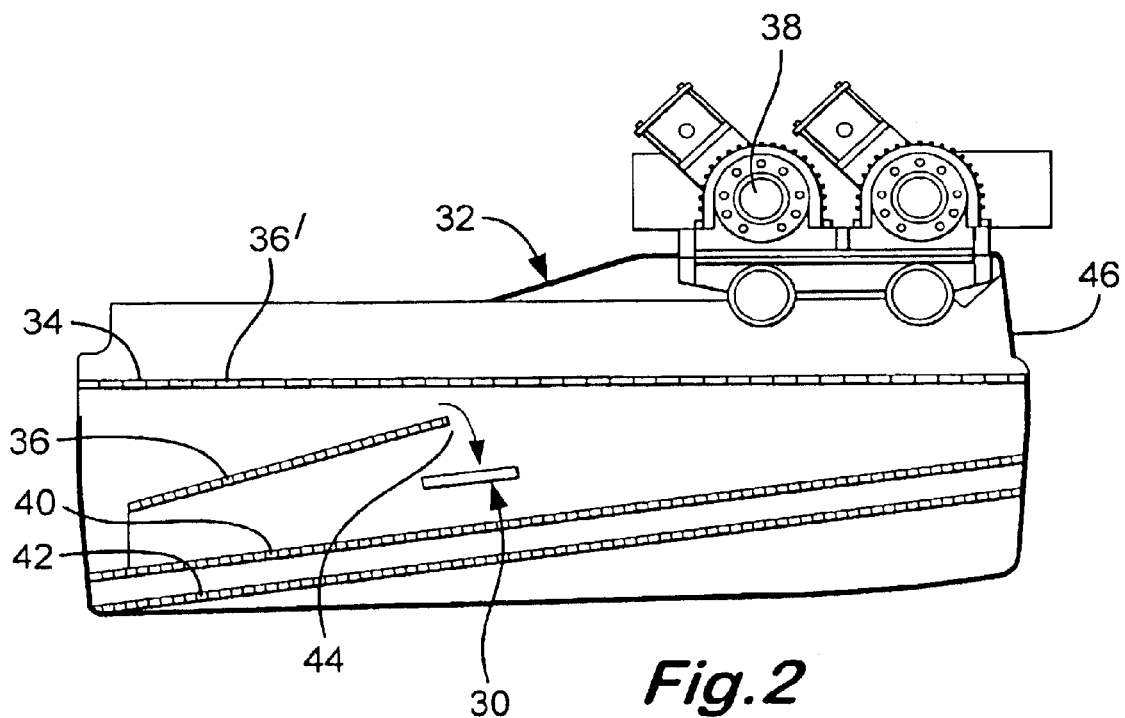

FIG. 2 shows a shale shaker 32 according to the present invention with a flow diffusion apparatus 30 according to the present invention. Fluid introduced at a fluid introduction end 34 of the shale shaker 32 flows to an upper screening deck 36. The major portion of this fluid flows from the upper screening deck 36 to an intermediate screening deck 40 and through the intermediate screening deck 40 to a lower screening deck 42. Fluid flowing from an end 44 of the intermediate screening deck 40 (see arrow, FIG. 2) flows down onto the flow diffusion apparatus 30 which, in the embodiment shown, is a solid plate; but which, according to the present invention, may have one or more holes, etc. for fluid flow therethrough.

Vibrator apparatus 38 vibrates a screen mounting basket 46 in which the screening decks are located.

Figure 3:
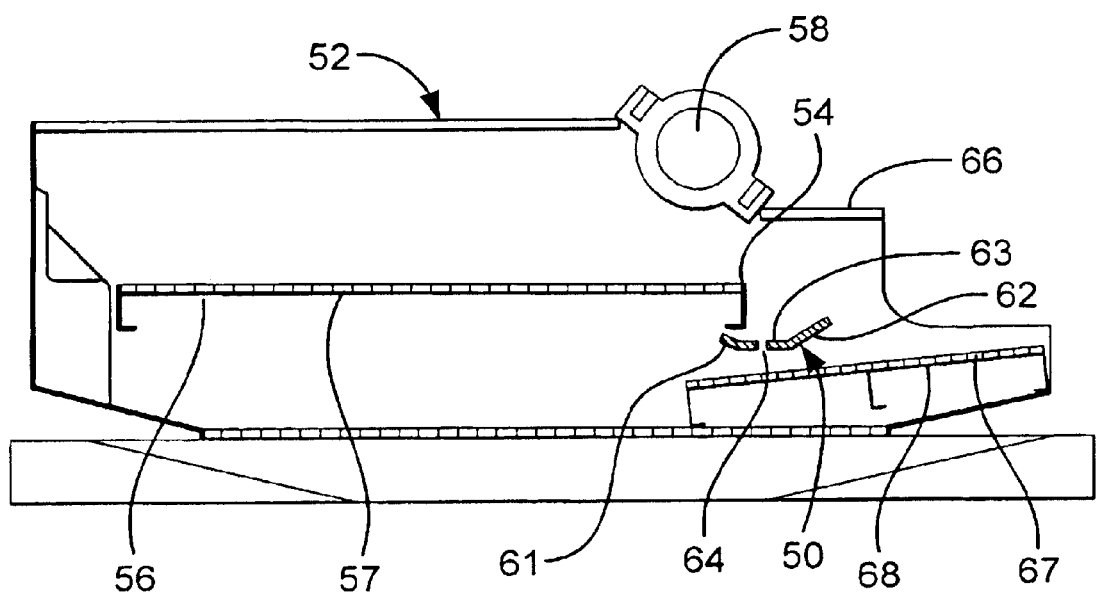

FIG. 3 shows a shale shaker 52 according to the present invention which has a flow diffusion apparatus 50 according to the present invention which is positioned below a fluid exit end 54 of an upper screening deck 56 with screen assembly (or assemblies) 57 [which, as may be any screen etc. of any embodiment herein, may be any suitable known screen(s), screen apparatus(es), or screen assembly or assemblies]. Viewed on end the flow diffusion apparatus has two sides 61, 62 spaced apart by a flat part 63 in a truncated "V" shape, but it is within the scope of this invention for any flow diffusion apparatus herein to be "V" shaped, "U" shaped, truncated "V" or "U" shaped, or flat. In one aspect side 61 and/or side 62 is deleted.

Figure 4:
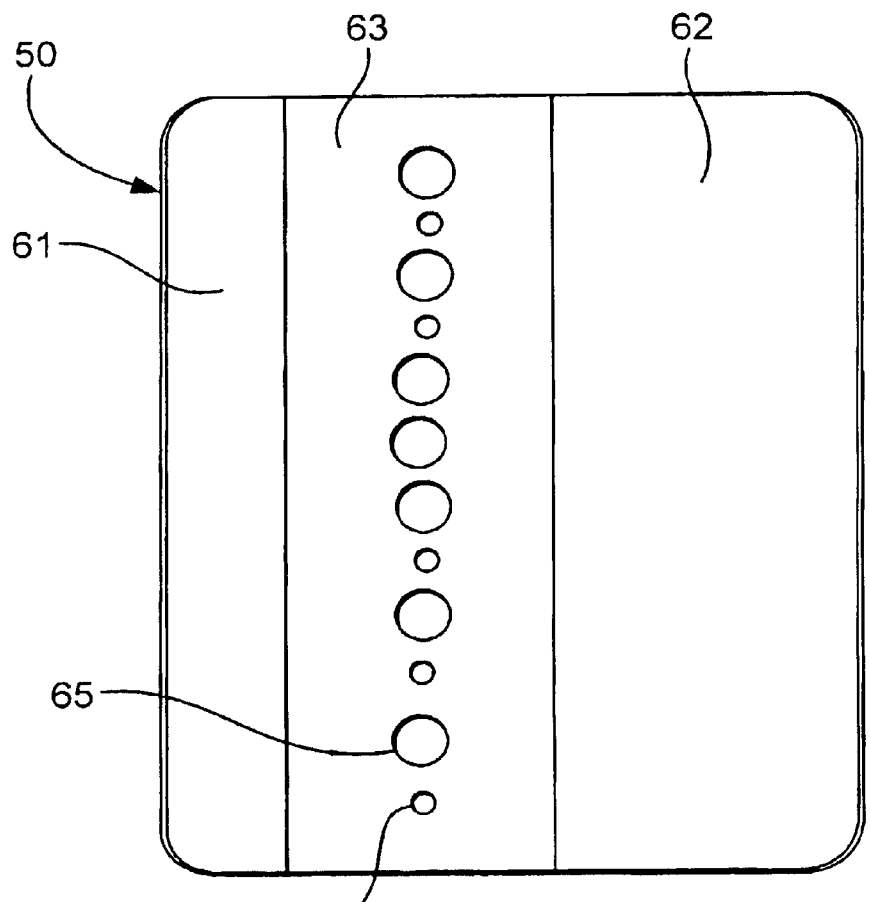
FIG. 4 is a top view of the flow diffuser of the shale shaker of FIG. 3.

Fluid flowing from the fluid exit end 54 of the upper screening deck 56 falls into the flow diffusion apparatus 50 and moves from there down onto a lower screening deck 68 with a screen assembly 67 thereon [which, as may be any screen etc. of any embodiment herein, may be any suitable known screen(s), screen apparatus(es), or screen assembly or assemblies]. As shown in FIG. 4 fluid flow holes 64 and 65 (of different diameters) are present in the flat part 63 of the flow diffusion apparatus 50. In one aspect, all of the holes are of the same diameter. In one aspect the flow diffusion apparatus 50 extends under and corresponds in length to slightly less than the width of the upper screening deck 56 above the flow diffusion apparatus 50.

Vibrator apparatus 58 vibrates a screen mounting basket 66 in which are secured the screening decks 56 and 68.

FIG. 4 shows the flow diffusion apparatus 50 (top view) with its holes 64, 65.

Figure 5:
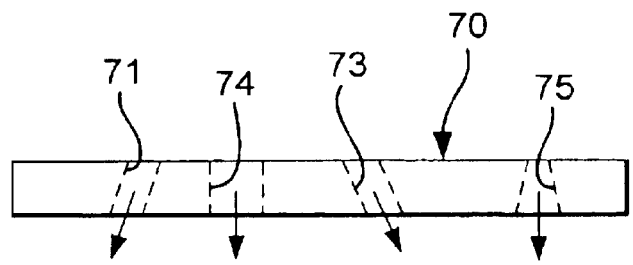
FIG. 5 is a cross-sectional view of a flow diffuser according to the present invention.

FIG. 5 illustrates alternative configurations for any hole of any flow diffusion apparatus according to the present invention. A hole 71 through a flow diffusion apparatus 70 according to the present invention is at an angle (non-normal) to a body 72 of the flow diffusion apparatus 70; a hole 73 is at another angle (non-normal) to the body 72; a hole 74 is straight through the body 72 and normal to the body 72; and a hole 75 is generally conical viewed in cross-section as shown in FIG. 5 and is smaller in size at the top of the body 72 than at the bottom, although it is within the scope of this invention to invert the conical shape as shown in FIG. 5. (Arrows through holes indicate flow direction).

Although the flow diffusion apparatus in FIGS. 1–3 have been shown in specific vibratory separators, it is within the scope of the present invention for any flow diffuser according to the present invention to be used with any multi-deck separator or shaker; e.g., but not limited to those as disclosed in U.S. Pat. Nos. 6,412,644 and 6,155,428 and in the references cited therein; and in PCT Applications PCT/EP96/01835 and WO 96/33792—all of these patents, references and applications incorporated fully herein for all purposes. In one particular aspect the body or pieces of the flow diffusion apparatus are made of steel, about ¼" thick. In other aspects this thickness ranges between ⅛" and ¾", although any suitable thickness may be used.

Any flow diffusion apparatus herein may be any desired size and configuration. Although the apparatuses shown herein are generally rectangular, it is within the scope of this invention to have flow diffusers that are, viewd from above, any desired shape, including, but not limitid to, oval, elliptical, trapezoidal, triangular, square, or polygonal.

Any flow diffusion apparatus according to the present invention may be made from any suitable material, including, but not limited to, plastic, metal, fiberglass, wood, composite material, cermet, and ceramic.

Figure 6A:
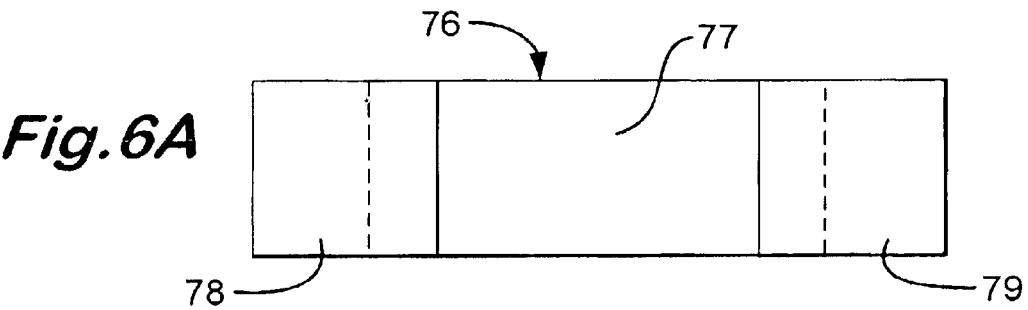
FIG. 6A is a top view of a flow diffuser according to the present invention.
Figure 6B:
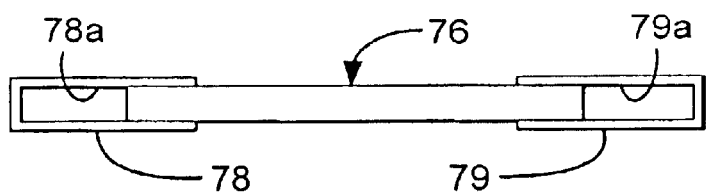
FIG. 6B is a side cross-sectional view of the flow diffuser of FIG. 6A.

FIGS. 6A and 6B show a flow diffuser 76 according to the present invention with a main part 77 and two extendable side parts 78,79 each with a recess 78a, 79a, respectively, which receives a portion of the main part 77. By adjusting the amount of the main part 77 that is within the recesses 78a, 79a, the effective width of the flow diffuser 76 can be adjusted to accommodate the width of a flow, or part thereof, from an upper screen deck. the parts can be held together with a friction fit and/or with any suitable connector(s) and/or adhesive(s). As shown the flow diffuser 76 is oriented for width extension of its parts, e.g., toward the sides of a shale shaker, but it is within the scope of this invention for the flow diffuser 76 to be oriented so that it is adjustable in directions generally aligned with the length of a shale shaker. It is also within the scope of the present invention for a shale shaker according to the present invention to have extendable parts for adjusting the extent of a flow diffuser in both length and width so that an area (in length and in width) of a flow from above may above accommodated.

Figure 7:
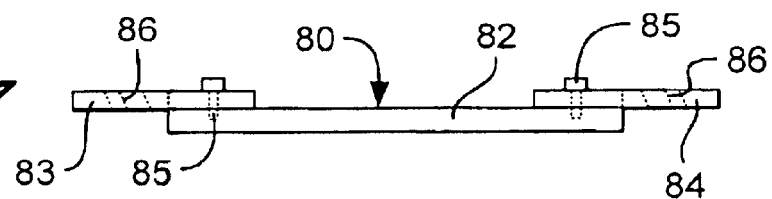
FIG. 7 is a side of a flow diffuser according to the present invention.

FIG. 7 shows a flow diffuser 80 according to the present invention that has a main part 82 to which are secured side parts 83, 84 with one or more bolts 85. The side parts 83, 84 may be any desirable size and may have a series of holes 86 to provide for size (length, width, and/or area) adjustment.

Figure 8:
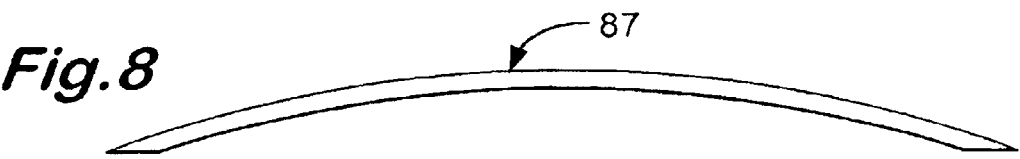
FIG. 8 is a side of a flow diffuser according to the present invention.

FIG. 8 shows a flow diffuser 87 according to the present invention which has (as may any flow diffuser herein) a generally curved shape when viewed on end.

Figure 9:
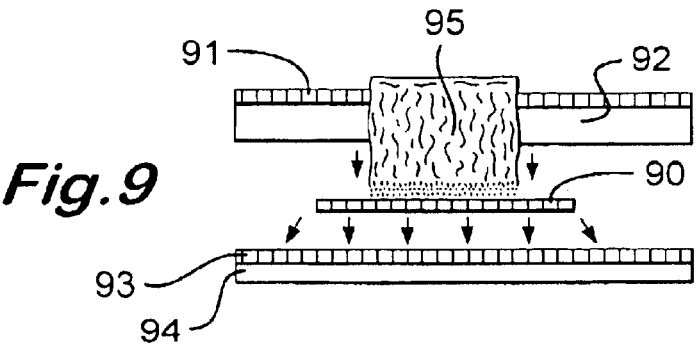
FIG. 9 is a side view of screen assemblies in a shale shaker according to the present invention with flow diffusion apparatus according to the present invention.

FIG. 9 shows a flow diffuser 90 according to the present invention beneath an upper screen deck 92 with a screen assembly 91 thereon and above a lower screen deck 94 with a screen assembly 93 thereon (of a shale shaker, not shown in its entirety). Although fluid and material flows off the entire width of the upper screen deck 92, a main flow 95 flows down from a generally central portion of the upper screen deck 92 and impacts the flow diffuser 90. Arrows indicate how the flow diffuser spreads out the flow from the upper deck 92 onto the lower screen deck 94. Although the flow diffuser 90 is shown with a width less than the width of the upper screen deck 92, it is within the scope of this invention for the flow diffuser 90 (as may be any flow diffuser according to the present invention) to have a width only slightly less than that of an upper screen deck, or to be of any desired width.

The present invention, therefore, provides, in at least certain embodiments, a vibratory separator with basket apparatus for holding screening apparatus, at least one upper screen apparatus in the basket, the at least one upper screen apparatus having a fluid exit end, at least one lower screen apparatus in the basket below the at least one upper screen apparatus, fluid (e.g., with solids, cutting, debris, etc. therein) flowable from the at least one upper screen apparatus down onto the at least one lower screen apparatus, flow diffusion apparatus mounted below the fluid exit end of the at least one upper screen apparatus and above the at least one lower screen apparatus, so that fluid flowing down from the at least one upper screen apparatus flows onto the flow diffusion apparatus and is diffused thereby, and vibrator apparatus for vibrating the basket and the screen apparatus therein. Such an apparatus may have one or some, in any possbile combination, of the following: at least one hole through the flow diffusion apparatus, fluid passable through the at least one hole; wherein the at least one hole is a plurality of spaced-apart holes; wherein the at least one hole passes through the flow diffusion apparatus and is substantially normal thereto; wherein the at least one hole passes through the flow diffusion apparatus and is at an angle other than normal thereto; wherein the holes pass through the flow diffusion apparatus at different angles thereto; wherein the flow diffusion apparatus is made from material from the group consisting of, but not limited to, plastic, metal, fiberglass, wood, composite material, cermet, and ceramic; wherein the at least one lower screen apparatus is a lowermost screen apparatus and an intermediate screen apparatus, the intermediate screen apparatus positioned between the at least one upper screen apparatus and the lowermost screen apparatus; wherein the flow diffusion apparatus has a main part with a first side and a second side, a first side connected to and projecting upwardly from the first side of the main part, and a second side connected to and projecting upwardly from the second side; wherein the flow diffusion apparatus is positioned substantially horizontally in the vibratory separator; wherein the flow diffusion apparatus is positioned substantially non-horizontally in the vibratory separator; wherein the vibratory separator is a shale shaker and the fluid is drilling fluid with solids, etc. therein; wherein the flow diffusion apparatus has multiple parts securable together in a plurality of positions to provide a plurality of surfaces of different areas for impact by fluid flowing down from the at least one upper screen apparatus; wherein the flow diffusion apparatus is adjustable in surface area to intercept a substantial portion of the fluid flowing down from the at least one upper screen apparatus; wherein the at least one upper screen apparatus has a width and the flow diffusion apparatus has a width less than that of the at least one upper screen apparatus; and/or wherein the flow diffusion apparatus viewed on end has a curved shape.

The present invention, therefore, provides, in at least certain embodiments, a vibratory separator with basket apparatus for holding screening apparatus, at least one upper screen apparatus in the basket, the at least one upper screen apparatus having a fluid exit end, at least one lower screen apparatus in the basket below the at least one upper screen apparatus, fluid flowable from the at least one upper screen apparatus down onto the at least one lower screen apparatus, flow diffusion apparatus (according to the present invention) mounted below the fluid exit end of the at least one upper screen apparatus and above the at least one lower screen apparatus, so that fluid flowing down from the at least one upper screen apparatus flows onto the flow diffusion apparatus and is diffused thereby, and vibrator apparatus for vibrating the basket and the screen apparatus therein, wherein the at least one hole is a plurality of spaced-apart holes, wherein the flow diffusion apparatus is made from material from the group consisting of, but not limited to, plastic, metal, fiberglass, wood, composite material, cermet, and ceramic, wherein the at least one lower screen apparatus has a lowermost screen apparatus and an intermediate screen apparatus, the intermediate screen apparatus positioned between the at least one upper screen apparatus and the lowermost screen apparatus, and wherein the flow diffusion apparatus has a main part with a first side and a second side, a first side connected to and projecting upwardly from the first side of the main part, and a second side connected to and projecting upwardly from the second side.

The present invention, therefore, provide, in at least certain embodiments, methods for treating fluid (e.g., but not limited to, drilling fluid with solids etc. therein) with a vibratory separator (e.g., but not limited to, a shale shaker), the methods including feeding fluid to be treated to a vibratory separator, the vibratory separator like any disclosed herein according to the present invention with any flow diffuser or flow diffusion apparatus described herein, and diffusing with the flow diffuser or flow diffusion apparatus fluid flowing onto the flow diffuser or flow diffusion apparatus.

In conclusion, therefore, it is seen that the present invention and the embodiments disclosed herein and those covered by the appended claims are well adapted to carry out the objectives and obtain the ends set forth. Certain changes can be made in the subject matter described, shown and claimed without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A vibratory separator comprising
  basket apparatus for holding screening apparatus,
  at least one upper screen apparatus in the basket, the at least one upper screen apparatus having a fluid exit end, the at least one upper screen apparatus for screening fluid introduced thereon so that a first part of the fluid flows through the at least one upper screen apparatus and a second part of the fluid flows off the fluid exit end of the at least one upper screen apparatus without passing therethrough,
  at least one lower screen apparatus in the basket below the at least one upper screen apparatus,
  the first part of the fluid flowing down onto the at least one lower screen apparatus for screening thereby,
  flow diffusion apparatus mounted below the fluid exit end of the at least one upper screen apparatus and above the at least one lower screen apparatus, at least a portion of the flow diffusion apparatus projecting beyond the fluid exit end of the at least one upper screen apparatus so that the second part of the fluid flowing down from the at least one upper screen apparatus is intercepted by and flows onto the flow diffusion apparatus and is diffused down onto the at least one lower screen apparatus,
  vibrator apparatus for vibrating the basket and the screen apparatus therein,
  wherein the flow diffusion apparatus is made from material from the group consisting of plastic, metal, fiberglass, wood, composite material, cermet, and ceramic, wherein the flow diffusion apparatus comprises
a main part with a central body, a first side and a second side,
the first side connected to and projecting upwardly from the central body part, and
the second side connected to and projecting upwardly from the central body.

2. A method for treating fluid with a vibratory separator, the method comprising
feeding fluid to be treated to a vibratory separator, the vibratory separator comprising basket apparatus for holding screening apparatus, at least one upper screen apparatus in the basket, the at least one upper screen apparatus having a fluid exit end, the at least one upper screen apparatus for screening fluid introduced thereon so that a first part of the fluid flows through the at least one upper screen apparatus and a second part of the fluid flows off the fluid exit end of the at least one upper screen apparatus without passing therethrough, at least one lower screen apparatus in the basket below the at least one upper screen apparatus, the first part of the fluid flowing down onto the at least one lower screen apparatus for screening thereby, flow diffusion apparatus mounted below the fluid exit end of the at least one upper screen apparatus and above the at least one lower screen apparatus, at least a portion of the flow diffusion apparatus projecting beyond the fluid exit end of the at least one upper screen apparatus so that the second part of the fluid flowing down from the at least one upper screen apparatus is intercepted by and flows onto the flow diffusion apparatus and is diffused down onto the at least one lower screen apparatus, and vibrator apparatus for vibrating the basket and the screen apparatus therein, and
diffusing with the flow diffusion apparatus flow of fluid from the at least one upper screen apparatus.

3. The method of claim 2 wherein the flow diffusion apparatus has at least one hole therethrough, the method further comprising
flowing fluid through the at least one hole.

4. The method of claim 2 wherein the flow diffusion apparatus comprises
a main part with a central body, a first side and a second side,
the first side connected to and projecting upwardly from the central part, and
the second side connected to and projecting upwardly from the central part.

5. The method of claim 2 wherein the at least one lower screen apparatus comprises a lowermost screen apparatus and an intermediate screen apparatus, the intermediate screen apparatus positioned between the at least one upper screen apparatus and the lowermost screen apparatus, the method further comprising
flowing fluid from the at least one upper screen apparatus onto and through the intermediate screen apparatus onto and through the lowermost screen apparatus.

6. A vibratory separator comprising
basket apparatus for holding screening apparatus,
at least one upper screen apparatus in the basket, the at least one upper screen apparatus having a fluid exit end, the at least one upper screen apparatus for screening fluid introduced thereon so that a first part of the fluid flows through the at least one upper screen apparatus and a second part of the fluid flows off the fluid exit end of the at least one upper screen apparatus without passing therethrough,
at least one lower screen apparatus in the basket below the at least one upper screen apparatus,
the first part of the fluid flowing down onto the at least one lower screen apparatus for screening thereby,
flow diffusion apparatus mounted below the fluid exit end of the at least one upper screen apparatus and above the at least one lower screen apparatus, at least a portion of the flow diffusion apparatus projecting beyond the fluid exit end of the at least one upper screen apparatus so that the second part of the fluid flowing down from the at least one upper screen apparatus is intercepted by and flows onto the flow diffusion apparatus and is diffused down onto the at least one lower screen apparatus, and
vibrator apparatus for vibrating the basket and the screen apparatus therein,
wherein the vibratory separator is a shale shaker and the fluid comprises drilling fluid with solids therein.

7. The vibratory separator of claim 6, the flow diffusion apparatus further comprising
at least one hole through the flow diffusion apparatus, fluid passable through the at least one hole.

8. The vibratory separator of claim 7 wherein the at least one hole is a plurality of spaced-apart holes.

9. The vibratory separator of claim 7 wherein the at least one hole passes through the flow diffusion apparatus and is substantially normal thereto.

10. The vibratory separator of claim 7 wherein the at least one hole passes through the flow diffusion apparatus and is at an angle other than normal thereto.

11. The vibratory separator of claim 7 wherein the holes pass through the flow diffusion apparatus at different angles thereto.

12. The vibratory separator of claim 6 wherein the flow diffusion apparatus is made from material from the group consisting of plastic, metal, fiberglass, wood, composite material, cermet, and ceramic.

13. The vibratory separator of claim 6 wherein the at least one lower screen apparatus comprises a lowermost screen apparatus and an intermediate screen apparatus, the intermediate screen apparatus positioned between the at least one upper screen apparatus and the lowermost screen apparatus.

14. The vibratory separator of claim 6 wherein the flow diffusion apparatus comprises
a main part with a central body, a first side and a second side,
the first side connected to and projecting upwardly from the central body of the main part, and
the second side connected to and projecting upwardly from the central body side.

15. The vibratory separator of claim 6 wherein the flow diffusion apparatus is positioned substantially horizontally in the vibratory separator.

16. The vibratory separator of claim 6 wherein the flow diffusion apparatus is positioned substantially non-horizontally in the vibratory separator.

17. The vibratory separator of claim 6 wherein the flow diffusion apparatus is comprised of multiple parts securable together in a plurality of positions to provide a plurality of surfaces of different areas for impact by fluid flowing down from the at least one upper screen apparatus.

18. The vibratory separator of claim 17 wherein the flow diffusion apparatus is adjustable in surface area to intercept a substantial portion of the fluid flowing down from the at least one upper screen apparatus.

19. The vibratory separator of claim 6 wherein the at least one upper screen apparatus has a width and the flow diffusion apparatus has a width less than that of the at least one upper screen apparatus.

20. The vibratory separator of claim 6 wherein the flow diffusion apparatus viewed on end has a curved shape.

21. A vibratory separator comprising basket apparatus for holding screening apparatus, at least one upper screen apparatus in the basket, the at least one upper screen apparatus having a fluid exit end, the at least one upper screen apparatus for screening fluid introduced thereon so that a first part of the fluid flows through the at least one upper screen apparatus and a second part of the fluid flows off the fluid exit end of the at least one upper screen apparatus without passing therethrough, at least one lower screen apparatus in the basket below the at least one upper screen apparatus, the first part of the fluid flowing down onto the at least one lower screen apparatus for screening thereby, flow diffusion apparatus mounted below the fluid exit end of the at least one upper screen apparatus and above the at least one lower screen apparatus, at least a portion of the flow diffusion apparatus projecting beyond the fluid exit end of the at least one upper screen apparatus so that the second part of the fluid flowing down from the at least one upper screen apparatus is intercepted by and flows onto the flow diffusion apparatus and is diffused down onto the at least one lower screen apparatus, and vibrator apparatus for vibrating the basket and the screen apparatus therein, wherein the flow diffusion apparatus comprises a main part with a central body, a first side and a second side, the first side connected to and projecting upwardly from the central body of the main part, and the second side connected to and projecting upwardly from the central body side.

22. The vibratory separator of claim 21, the flow diffusion apparatus further comprising at least one hole through the flow diffusion apparatus, fluid passable through the at least one hole.

23. The vibratory separator of claim 22, wherein the at least one hole is a plurality of spaced-apart holes.

24. A vibratory separator comprising basket apparatus for holding screening apparatus, at least one upper screen apparatus in the basket, the at least one upper screen apparatus having a fluid exit end, the at least one upper screen apparatus for screening fluid introduced thereon so that a first part of the fluid flows through the at least one upper screen apparatus and a second part of the fluid flows off the fluid exit end of the at least one upper screen apparatus without passing therethrough, at least one lower screen apparatus in the basket below the at least one upper screen apparatus, the first part of the fluid flowing down onto the at least one lower screen apparatus for screening thereby, flow diffusion apparatus mounted below the fluid exit end of the at least one upper screen apparatus and above the at least one lower screen apparatus, at least a portion of the flow diffusion apparatus projecting beyond the fluid exit end of the at least one upper screen apparatus so that the second part of the fluid flowing down from the at least one upper screen apparatus is intercepted by and flows onto the flow diffusion apparatus and is diffused down onto the at least one lower screen apparatus, vibrator apparatus for vibrating the basket and the screen apparatus therein, wherein the flow diffusion apparatus is adjustable in surface area to intercept a substantial portion of the fluid flowing down from the at least one upper screen apparatus.

25. A vibratory separator comprising basket apparatus for holding screening apparatus, at least one upper screen apparatus in the basket, the at least one upper screen apparatus having a fluid exit end, the at least one upper screen apparatus for screening fluid introduced thereon so that a first part of the fluid flows through the at least one upper screen apparatus and a second part of the fluid flows off the fluid exit end of the at least one upper screen apparatus without passing therethrough, at least one lower screen apparatus in the basket below the at least one upper screen apparatus, the first part of the fluid flowing down onto the at least one lower screen apparatus for screening thereby, flow diffusion apparatus mounted below the fluid exit end of the at least one upper screen apparatus and above the at least one lower screen apparatus, at least a portion of the flow diffusion apparatus projecting beyond the fluid exit end of the at least one upper screen apparatus so that the second part of the fluid flowing down from the at least one upper screen apparatus is intercepted by and flows onto the flow diffusion apparatus and is diffused down onto the at least one lower screen apparatus, and vibrator apparatus for vibrating the basket and the screen apparatus therein, wherein the flow diffusion apparatus viewed on end has a curved shape.

* * * * *